United States Patent
Li et al.

(10) Patent No.: US 12,312,447 B2
(45) Date of Patent: May 27, 2025

(54) PREPARATION METHOD FOR POLYSACCHARIDE SPHERICAL GEL RESIN

(71) Applicant: ZHEJIANG TRIPLE WIN NEW MATERIAL CO., LTD., Jiaxing (CN)

(72) Inventors: Yan Li, Jiaxing (CN); Chengyu Zhang, Jiaxing (CN); Qinhua Zhou, Jiaxing (CN)

(73) Assignee: ZHEJIANG TRIPLE WIN NEW MATERIAL CO., LTD., Jiaxing (CN)

( * ) Notice: Subject to any disclaimer, the term of this patent is extended or adjusted under 35 U.S.C. 154(b) by 0 days.

(21) Appl. No.: 18/660,547

(22) Filed: May 10, 2024

(65) Prior Publication Data

US 2024/0417519 A1   Dec. 19, 2024

Related U.S. Application Data

(63) Continuation of application No. PCT/CN2023/125525, filed on Oct. 20, 2023.

(30) Foreign Application Priority Data

Jun. 19, 2023 (CN) .......................... 202310722387.0

(51) Int. Cl.
C08J 3/075 (2006.01)
C08J 3/24 (2006.01)
C08K 5/1515 (2006.01)

(52) U.S. Cl.
CPC .............. C08J 3/075 (2013.01); C08J 3/24 (2013.01); C08K 5/1515 (2013.01); C08J 2305/00 (2013.01)

(58) Field of Classification Search
CPC .......... C08J 3/075; C08J 3/24; C08J 2305/00; C08K 5/1515
USPC ...................................................... 536/123.1
See application file for complete search history.

(56) References Cited

U.S. PATENT DOCUMENTS 5,725,888 A * 3/1998 Scott ..................... C12N 11/04
                                                                425/10
5,827,937 A   10/1998 Angstrom
6,602,990 B1   8/2003 Berg

FOREIGN PATENT DOCUMENTS

| CA | 2251050 A1 | 10/1997 |
|---|---|---|
| CN | 102389755 B | 7/2014 |
| CN | 105713212 A | 6/2016 |
| CN | 212554576 U | 2/2021 |
| CN | 113634204 A | 11/2021 |
| CN | 115260545 A | 11/2022 |
| CN | 115947901 A | 4/2023 |
| EP | 1413298 A1 * | 4/2004 |
| WO | WO 2020/126730 * | 6/2020 |

OTHER PUBLICATIONS

Notification to Grant Patent Right for Invention, Chinese Application No. 202310722387.0 mailed Apr. 17, 2024 (3 pages).

* cited by examiner

Primary Examiner — Yih-Horng Shiao
(74) Attorney, Agent, or Firm — Daniel M. Cohn

(57) ABSTRACT

The present disclosure discloses a preparation method for polysaccharide spherical gel resin, and belongs to the technical field of compositions of high-molecular compounds. The preparation method includes: (1) adding a polysaccharide, a solvent and an auxiliary agent into a batching kettle at a ratio, performing heating to 85-95° C., and performing stirring until being clarified to obtain a polysaccharide mixed solution; (2) conveying the mixed solution to a drip tray, and performing heat preservation at 60-90° C.; (3) adding spherical liquid drops formed from the mixed solution by a liquid drop forming device into a forming tower to form polysaccharide spherical gels; (4) performing oil-sphere separation; (5) performing primary cleaning; (6) performing primary screening; (7) performing secondary crosslinking; and (8) performing secondary cleaning to obtain a final product. According to the present disclosure, the polysaccharide spherical gel resin has advantages of good sphericity, high strength, high yield, and good appearance.

8 Claims, No Drawings

PREPARATION METHOD FOR POLYSACCHARIDE SPHERICAL GEL RESIN

TECHNICAL FIELD

The present disclosure belongs to the technical field of high-molecular compositions, and specifically relates to a preparation method for polysaccharide spherical gel resin.

BACKGROUND

Gels refer to spatial network structures formed by connecting colloidal particles or molecules to each other under certain conditions, in which structural gaps are filled with a special dispersion system as a dispersion medium. The gels have many classification methods, and are usually classified according to sources, media, molecular composition, crosslinking methods for forming three-dimensional network structures and the like. According to different sources, the gels can be divided into natural gels and synthetic gels, and most of the natural gels are hydrogels formed by some saccharides or protein derivatives (such as agar, starch, collagen and gelatin) and water as a solvent. According to different media in the network structures, the gels can be divided into organic gels, hydrogels, aerogels or dry gels. According to differences of the molecular composition, the gels can be divided into small molecular gels and large molecular gels. According to different crosslinking methods, the gels can be divided into chemical gels and supramolecular gels. The chemical gels are formed by crosslinking with strong chemical bonds, and the whole network structures can neither be dissolved nor undergo thermal transformation. Therefore, the chemical gels are usually irreversible, and the structures can only be expanded or contracted under certain conditions (such as adding or removing a solvent).

Conventional high-molecular gels are generally polymerized by using water-soluble monomers, such as acrylic acid and salts thereof, polyvinyl alcohol, acrylamide and other monomers. Such synthetic gels have the disadvantages of environmental pollution, no biodegradability and the like.

Natural polysaccharides have been widely used in the food industry, which are products prepared by a physical crosslinking (with hydrogen bonds or ionic bonds) method with gum or polysaccharides extracted from plants or extracted by biological fermentation as raw materials. Agar is a natural high-molecular polysaccharide extracted from red alga. Agarose can be obtained by removing an agar pectin portion containing sulfate (salt), glucuronic acid and pyruvate aldehyde from the agar. Although both the agar and the agarose can form gels, the agarose is an uncharged neutral substance that does not affect solute molecules compared with the agar. Therefore, the agarose is mainly used as a medium for crystallization by researchers. The agarose gel medium is mainly used for crystallization of inorganic materials, proteins and amino acids.

High-molecular gels are mainly produced by chemical crosslinking (with chemical bonds) or physical crosslinking (with hydrogen bonds and the like) of macromolecules (such as agar and gelatin) or polymers (such as polyesters and polyamides). The high-molecular gels are irreversible when produced by enhanced chemical crosslinking; and the high-molecular gels are thermally reversible when produced by physical crosslinking.

A Chinese invention patent CN102389755B discloses a preparation method for agar gel microspheres. Agar is used as a raw material in the method, and the agar gel microspheres with an agar content of 4-20 wt %, a regular spherical shape and a uniform particle size in a controllable range of 1-900 μm are prepared by the processes of preparation of an oil phase and an aqueous phase, dispersion and emulsification, cooling and curing, crosslinking and ligand modification. By using the method, the agar gel microspheres are prepared by an inverse suspension dispersion polymerization method, and the obtained gel microspheres have a small particle size (less than 1 mm). In addition, due to the suspension dispersion polymerization, the obtained particles have certain particle size distribution and polydispersity.

A United States patent U.S. Pat. No. 6,602,990B1 discloses a method for preparing porous crosslinked polysaccharide gels. Gel crosslinking is performed by a reaction between hydroxyl of a polysaccharide and an active site of a crosslinking agent to form the polysaccharide gels. The obtained crosslinked polysaccharide gels can be further crosslinked for one time or several times by a conventional method. The method is used for manufacturing high-rigidity gel particles with a small particle size (about 10 μm).

A United States patent U.S. Pat. No. 5,827,937A discloses a preparation method for a crosslinked polysaccharide gel composition with biocompatibility. In the presence of a multifunctional crosslinking agent, a polysaccharide solution is subjected to chemical crosslinking to produce a viscoelastic gel. The prepared gel is an amorphous viscoelastic gel and is mainly used in the field of medical apparatus and instruments.

Existing technologies and methods have the common characteristics that gels with a small particle size and uneven particle distribution or amorphous gels are prepared by chemical crosslinking at an active site of a polysaccharide solution, and polysaccharide spherical gels with a large particle size (greater than 4 mm) and a uniform particle size cannot be prepared.

As observed by Wang et al. (J. Am. Chem. Soc. 2000, 122, 10, 2399-2400) with an atomic force microscope (AFM), fibers stacked by molecules are filled with about 30% of n-octanol, proving that an interaction is between solvent molecules and gel factors. Since solvent parameters represent a solvation ability of a solvent, the solvent parameters can be used for describing the influence of the solvent on properties of supramolecular gels. The results indicate that a dipole-dipole interaction and a hydrogen bond interaction between the solvent and the gel factors are main factors affecting the stability of the gels.

A relationship between the properties of the supramolecular gels and the solvent parameters is studied by Zhao Chengxiao et al. (Acta Phys. Chim. Sin. 2014, 30 (12), 2197-2209), and an influence law of solvents on gel properties is revealed. Research of the gel properties by using the solvent parameters is a new research method. In a same series of gels (gels formed by gelation of a same gel factor in different solvents), the gel properties and solubility parameters have a linear relationship or an exponential relationship, and the relationships reflect an influence law of changes of a solvent-gel factor effect on the gel properties. Generally, a hydrogen bonding ability of a solvent has a more significant effect on properties of hydrogen-bonded supramolecular gels than other intermolecular forces: a solvent with a stronger hydrogen bonding ability is easier to form hydrogen bonds with gel factors, and gels have poorer stability.

The gel forming ability and solubility of agar polysaccharides depend on a basic repeating unit, a long chain formed by alternately connecting 1,3-linked β-D-galactose and 1,4-linked 3,6-anhydro-L-galactose, and relative hydrophobicity of groups substituted by hydrophobic groups (such as methoxyl) and polar groups (such as sulfate and pyruvate). Each agarose chain contains about 800 galactose molecules, and an agarose polymer chain forms spiral fibers that aggregate into a superhelical structure with a radius of 20-30 nanometers (nm). The spiral fibers are quasi-rigid and have a wide length range, specifically depending on an agarose concentration. When solidified, the fibers form a three-dimensional network channel with a diameter in a range of 50-200 nm or above, specifically depending on an agarose concentration used. A 3-D gel structure is maintained by hydrogen bonds, and can be destroyed by heating to a liquid state.

Therefore, the gel forming ability of the agarose in a solvent can be changed by adjusting the solubility of the solvent of the agar polysaccharide, and high-strength polysaccharide gels can be prepared by adjusting the hydrogen bond interaction between the gels and the solvent. Since three-dimensional structures between the polysaccharide gels are obtained by crosslinking with hydrogen bonds, namely, by reversible physical crosslinking, irreversible deformation will be caused under the action of a certain time and pressure, and properties of products will be affected. Therefore, preparation of polysaccharide gels with high strength and stable structures by secondary chemical crosslinking has great significance.

SUMMARY

In view of the disadvantages of the prior art, the purpose of the present disclosure is to provide a preparation method for polysaccharide spherical gel resin. The prepared polysaccharide spherical gel resin has the advantages of large size, good sphericity, even particle size, high strength, high yield and the like.

A technical solution adopted for solving the technical problems in the present disclosure is: a preparation method for polysaccharide spherical gel resin. The preparation method mainly includes the following steps:

(1) adding a polysaccharide, a solvent and an auxiliary agent into a batching kettle at a certain ratio, performing heating to 85-95° C., and performing stirring until a clarified solution is obtained so as to obtain a polysaccharide mixed solution;

(2) conveying the polysaccharide mixed solution well dissolved in step (1) to a drip tray, and subjecting the drip tray to heat preservation at 60-90° C.;

(3) forming the polysaccharide mixed solution into spherical liquid drops by using a liquid drop forming device on the drip tray, and adding the spherical liquid drops into a forming tower; subjecting the polysaccharide mixed solution to curing and forming in the forming tower; and preparing polysaccharide spherical gels with different particle sizes by adjusting a blanking volume of the liquid drops, where the particle sizes are 4-15 mm, the liquid drop forming device is a needle with a changeable aperture at a bottom and a cavity and a valve that can adjust the volume at an upper portion, and the polysaccharide solution forms liquid drops on the needle and then drops under the action of gravity and pressure so as to form the spherical liquid drops;

(4) subjecting the polysaccharide spherical gels formed in step (3) to oil-sphere separation at a discharge port at a bottom of the forming tower;

(5) performing primary cleaning: subjecting the polysaccharide spherical gels obtained after the oil-sphere separation in step (4) to cleaning with micro-nano bubbles;

(6) performing primary screening: performing screening according to certain size requirements to obtain polysaccharide spherical gels with a target size;

(7) performing secondary crosslinking: adding a crosslinking agent to the qualified polysaccharide spherical gels screened in step (6), performing stirring for 1-4 hours, then adding an alkaline solution, and performing stirring at 20-50° C. for 1-24 hours; and (8) performing secondary cleaning: cleaning the polysaccharide spherical gels completely crosslinked in step (7) to reach a pH value of less than 8 so as to obtain a final product.

Further, in step (1), the polysaccharide is a mixture of one or more of agar, agarose, carrageenan, pectin, gelatin, guar gum, chitosan and sodium alginate, and is preferably agarose. A use amount of the polysaccharide is 1-5 parts by mass.

Further, in step (1), the solvent is pure water or an aqueous solution; the aqueous solution is a mixture of water and an organic solvent; the organic solvent is a mixture of one or more of ethylene glycol, propylene glycol, glycerol, butanediol, ethanol, propanol, butanol, hexanediol, octanediol, cyclohexanol, ethylene glycol monomethyl ether, acetonitrile, acetone, tetrahydrofuran, ethyl acetate, citric acid, tartaric acid, polyethylene glycol, ionic liquid, sucrose and sorbitol; in the aqueous solution, a volume ratio of the water to the organic solvent is 50:50 to 100:0; and a use amount of the solvent is 100 parts by mass.

Solubility parameter of the water can be adjusted by adding the organic solvent to the water. Since the solubility parameters represent a solvation ability of a solvent, the solvent parameters can be used for describing the influence of the solvent on properties of gels. A dipole-dipole interaction and a hydrogen bond interaction between the solvent and gel factors are main factors affecting the stability of the gels. Generally, a hydrogen bonding ability of a solvent has a more significant effect on properties of hydrogen-bonded supramolecular gels than other intermolecular forces: a solvent with a stronger hydrogen bonding ability is easier to form hydrogen bonds with gel factors, and gels have poorer stability.

Furthermore, the aqueous solution further includes a small amount of a salt; the salt is a mixture of one or more of a sodium salt, a potassium salt, a calcium salt, an aluminum salt and a magnesium salt; and a use amount of the salt is 0.1-3 parts by mass. The salt can change the ionic strength of the polysaccharide solution and improve the gel strength.

Further, in step (1), the auxiliary agent includes a pH regulator, a preservative, a flavor and a pigment.

Further, in step (3), the forming tower includes an oily medium, and the oily medium may include silicone oil, epoxy soybean oil, long chain alkane and grease. The forming tower is sequentially divided into a forming buffer area, a forming area and a curing area from top to bottom; the forming buffer area is controlled at a temperature of 40-50° C.; the forming area is controlled at a temperature of 10-40° C.; and the curing area is controlled at a temperature of 0-10° C.

When liquid drops from the liquid drop forming device into the forming tower, liquid drops will be deformed due to a certain impact force, and the sphericity of spherical gels will be affected by direct forming and curing. When the liquid drops pass through the forming buffer area, the liquid drops are not cured and are maintained spherical in the oily medium due to a small difference between a temperature in the forming buffer area and a temperature of the liquid drops. When the liquid drops slowly drop into the forming area, the polysaccharide mixed solution is slowly cured to obtain gels with high sphericity. When the liquid drops continuously drop into the curing area, polysaccharide spherical gels with high strength and good sphericity can be formed after the liquid drops stay for a period of time (10-30 minutes) at a low temperature.

According to a primary cleaning process, the cleaning is performed by a bubble cleaning device, the micro-nano bubbles are generated by a bubble generator, the oily medium on surfaces of the spherical gels is removed by cleaning, and then the oily medium is recovered by an oil-water separator after the cleaning so as to realize recycling. A cleaning agent is not required to be used in the cleaning process, such that wastewater discharge can be reduced.

After the primary screening is completed, the polysaccharide spherical gels with a qualified size are used for a next crosslinking process; and the unqualified gels are collected, recovered, heated, dissolved and dropped again.

Further, the crosslinking agent used in the secondary crosslinking is a crosslinking agent containing an epoxy group, and includes ethylene glycol diglycidyl ether, butanediol diglycidyl ether, polyethylene glycol diglycidyl ether, pentaerythritol tetraglycidyl ether, diethylene glycol diglycidyl ether and epichlorohydrin; and a use amount of the crosslinking agent is 0.1-3 parts by mass.

Further, the crosslinking agent is added into the polysaccharide mixed solution before dropping or added into the polysaccharide spherical gels after the screening.

Further, in step (7), the alkaline solution is an aqueous solution of sodium hydroxide, potassium hydroxide, sodium carbonate, potassium carbonate, sodium phosphate or potassium phosphate, with a pH value of 10-14. The alkaline solution can catalyze a crosslinking reaction between the epoxy group and active groups such as hydroxyl and amino on the polysaccharide.

The secondary cleaning is performed by a roller rotation method. On the one hand, a contact area can be increased so as to improve the cleaning efficiency. On the other hand, in a roller rotation process, the polysaccharide spherical gels can be further rounded so as to improve the sphericity, reduce deformation caused by extrusion in the forming process and increase the yield. A cleaning solution used in the secondary cleaning is water or an acidic aqueous solution.

The polysaccharide spherical gels can be used in water marbles, toys, incense balls, daily necessities, water retaining agents, medical apparatus and instruments and other fields.

The present disclosure has the following beneficial effects. Compared with the prior art, the preparation method for polysaccharide spherical gel resin provided by the present disclosure has the following advantages.

(1) A mixed solution of water and an organic solvent is used as the polysaccharide solvent for gel forming. By adjusting solubility parameters of the solution, a hydrogen bond interaction between the polysaccharide and the solution is changed, and the strength of the polysaccharide gels is improved.

(2) The secondary crosslinking is performed by a surface crosslinking method to form a core-shell structure. The added crosslinking agent penetrates into uncrosslinked polysaccharide spherical gels to form a certain concentration gradient in the spherical gels, which has a higher surface concentration and a lower inside concentration. Under a catalytic action of the alkaline solution, a crosslinking reaction is carried out. Due to a higher surface crosslinking degree and a lower inside crosslinking degree, spherical gels with core-shell structures and high-strength shells are formed. The polysaccharide spherical gels prepared after the secondary crosslinking have high strength, are not prone to irreversible deformation, and have elasticity and toughness.

(3) A forming process including dropping and multi-stage temperature control is used. Not only is the sphericity ensured, but also the gel strength is improved. When liquid drops from the liquid drop forming device into the forming tower, liquid drops will be deformed due to a certain impact force, and the sphericity of spherical gels will be affected by direct forming and curing. When the liquid drops pass through the forming buffer area, the liquid drops are not cured and are maintained spherical in the oily medium due to a small difference between a temperature in the forming buffer area and a temperature of the liquid drops. When the liquid drops slowly drop into the forming area, the liquid drops are slowly cured to achieve high sphericity. When the liquid drops continuously drop into the curing area, polysaccharide spherical gels with high strength and good sphericity are formed after the liquid drops stay for a period of time (10-30 minutes) at a low temperature.

(4) The polysaccharide gels containing the oily medium are cleaned with the micro-nano bubbles, a cleaning agent is not required to be used, and only water is used. On the one hand, the oily medium can be recovered. On the other hand, wastewater discharge is reduced. The cleaning is performed by a roller rotation method. On the one hand, a contact area can be increased so as to improve the cleaning efficiency. On the other hand, in a roller rotation process, the polysaccharide spherical gels can be further rounded so as to improve the sphericity, reduce deformation caused by extrusion in the forming process and increase the yield.

DETAILED DESCRIPTION

The present disclosure is further illustrated below through specific examples. However, these examples are used only to illustrate the present disclosure, rather than to limit the scope of the present disclosure.

Test methods are as follows.
(1) Gel Strength

The gel strength of gel resin is tested by a universal testing machine. Spherical gel particles are placed directly under a special gel strength probe, the particles are pressed by the gel probe until being broken, and a force required for breaking the particles is recorded and defined as the gel strength of spherical water-absorbing resin particles.
(2) Particle Size 10 polysaccharide spherical gels are randomly selected, gel sizes are measured with a vernier caliper, and an average value is calculated.
(3) Uniformity After screening is completed, a weight ratio of particles in a target particle size range (such as 7.0-8.0 mm) to total product particles is calculated.

Example 1

2 g of agarose, 90 g of water, 10 g of propylene glycol and a small amount of preservative were added into a batching kettle, heated to 90° C. and stirred until a clarified solution was obtained so as to obtain a polysaccharide mixed solution. The well dissolved polysaccharide mixed solution was conveyed to a drip tray, and the drip tray was subjected to heat preservation at 60-70° C. The polysaccharide mixed solution was formed into spherical liquid drops by a liquid drop forming device and then added into a forming tower. A buffer area in the forming tower was controlled at a temperature of 40-50° C.; a forming area was controlled at a temperature of 20-30° C.; and a curing area was controlled at a temperature of 0-10° C. Oil-sphere separation was performed at a discharge port at a bottom of the forming tower. Primary cleaning process: Polysaccharide spherical gels were subjected to cleaning and screening.

Secondary crosslinking: 1 g of butanediol diglycidyl ether was added into the qualified polysaccharide spherical gels obtained after the screening and stirred for 4 hours. 100 g of a 0.2% sodium hydroxide solution was added and stirred at 40° C. for 4 hours. Filtration was performed. After the crosslinking was completed, the polysaccharide spherical gels were cleaned by a rotation roller to reach a pH value of less than 8 so as to obtain a final product. 0.5% of phenoxyethanol was added as the preservative.

In Examples 2-8, a preparation method same as that in Example 1 is adopted, and a difference is that ratios of raw materials used are different. Specific use amounts are shown in Table 1 below.

at a bottom of the forming tower. Primary cleaning process: Polysaccharide spherical gels were subjected to cleaning and screening.

Secondary crosslinking: 100 g of a 0.2% sodium hydroxide solution was added and stirred at 40° C. for 24 hours. Filtration was performed. After the crosslinking was completed, the polysaccharide spherical gels were cleaned with an aqueous cleaning solution to reach a pH value of less than 8 so as to obtain a final product.

Comparative Example 1

3 g of agarose, 100 g of water and a small amount of a preservative were added into a batching kettle, heated to 90° C. and stirred until a clarified solution was obtained so as to obtain a polysaccharide mixed solution. The well dissolved polysaccharide mixed solution was conveyed to a drip tray, and the drip tray was subjected to heat preservation at 60-70° C. The polysaccharide mixed solution was formed into spherical liquid drops by a liquid drop forming device and then added into a forming tower. The forming tower was controlled at a temperature of 0-10° C. Oil-sphere separation was performed at a discharge port at a bottom of the forming tower. Rotary cleaning process: Polysaccharide spherical gels were subjected to rotary cleaning and screening.

TABLE 1

| Ingredients in Examples 2-8 | | | | | | | |
|---|---|---|---|---|---|---|---|
| | Example 2 | Example 3 | Example 4 | Example 5 | Example 6 | Example 7 | Example 8 |
| Agarose | 3 | 3 | 5 | \ | 2 | 2 | 3 |
| Gelatin | \ | \ | \ | \ | 1 | \ | \ |
| Carrageenan | \ | \ | \ | 4 | \ | 1 | \ |
| Water | 100 | 60 | 90 | 70 | 70 | 50 | 100 |
| Propylene glycol | \ | 40 | 10 | 30 | 30 | \ | \ |
| Glycerol | \ | \ | \ | \ | \ | 50 | \ |
| Sodium chloride | \ | \ | \ | \ | \ | \ | 1 |
| Butanediol diglycidyl ether | 1 | 1 | 2 | 0.5 | \ | 1 | 1 |
| Ethylene glycol diglycidyl ether | \ | \ | \ | \ | 1 | \ | \ |

Example 9

2.5 g of agarose, 100 g of water and 1 g of butanediol diglycidyl ether were added into a batching kettle, heated to 90° C. and stirred until a clarified solution was obtained so as to obtain a polysaccharide mixed solution. The well dissolved polysaccharide mixed solution was conveyed to a drip tray, and the drip tray was subjected to heat preservation at 60-70° C. A blanking volume of a liquid drop forming device was adjusted to reach a target particle size of 6.0-6.8 mm. The polysaccharide mixed solution was formed into spherical liquid drops by the liquid drop forming device and then added into a forming tower. A buffer area in the forming tower was controlled at a temperature of 40-50° C.; a forming area was controlled at a temperature of 20-30° C.; and a curing area was controlled at a temperature of 0-10° C. Oil-sphere separation was performed at a discharge port Comparative Example 2

3 g of agarose, 60 g of water, 40 g of propylene glycol and a small amount of a preservative were added into a batching kettle, heated to 90° C. and stirred until a clarified solution was obtained so as to obtain a polysaccharide mixed solution. The well dissolved polysaccharide mixed solution was conveyed to a drip tray, and the drip tray was subjected to heat preservation at 60-70° C. The polysaccharide mixed solution was formed into spherical liquid drops by a liquid drop forming device and then added into a forming tower. A buffer area in the forming tower was controlled at a temperature of 40-50° C.; a forming area was controlled at a temperature of 20-30° C.; and a curing area was controlled at a temperature of 0-10° C. Oil-sphere separation was performed at a discharge port at a bottom of the forming tower. Rotary cleaning process: Polysaccharide spherical gels were subjected to rotary cleaning and screening.

A strength test was carried out on the polysaccharide spherical gels obtained in Examples 1-9 and Comparative Examples 1-2 before and after the secondary crosslinking, respectively. Test results are shown in Table 2 below. In addition, the appearance was observed after the prepared polysaccharide spherical gels were placed for one month. Results are also shown in Table 2 below.

|  | Gel strength | | | | | Appearance |
|---|---|---|---|---|---|---|
|  | Before crosslinking (N) | After secondary crosslinking (N) | Average particle size (mm) | Target particle size | Uniformity (%) | (after placement for one month) |
| Example 1 | 3.1 | 15 | 7.3 | 7.0-8.0 mm | 92 | Smooth surface |
| Example 2 | 4.2 | 18 | 7.2 | 7.0-8.0 mm | 92 | Smooth surface |
| Example 3 | 5.2 | 18.5 | 7.5 | 7.0-8.0 mm | 94 | Smooth surface |
| Example 4 | 6.5 | 23.7 | 8.3 | 8.0-9.0 mm | 95 | Smooth surface |
| Example 5 | 3.1 | 13.3 | 7.5 | 7.0-8.0 mm | 93 | Smooth surface |
| Example 6 | 3.5 | 14.2 | 7.4 | 7.0-8.0 mm | 92 | Smooth surface |
| Example 7 | 3.3 | 14.3 | 7.3 | 7.0-8.0 mm | 91 | Smooth surface |
| Example 8 | 4.5 | 19.1 | 7.5 | 7.0-8.0 mm | 92 | Smooth surface |
| Example 9 | 3.6 | 15.8 | 6.1 | 6.0-6.8 mm | 89 | Smooth surface |
| Comparative Example 1 | 2.0 | — | 7.4 | 7.0-8.0 mm | 93 | Surface with pits |
| Comparative Example 2 | 4.8 | — | 7.3 | 7.0-8.0 mm | 93 | Surface with pits |

The above embodiments are merely used to describe the present disclosure, rather than to limit the present disclosure. For persons of ordinary skill in a relevant technical field, various changes and variants can also be made without deviating from the spirit and scope of the present disclosure. Therefore, all equivalent technical solutions also fall within the scope of the present disclosure, and the scope of protection of the disclosure patent shall be limited by the claims.

What is claimed is:

1. A preparation method for polysaccharide spherical gel resin, the preparation method comprising the following steps:
   (1) adding a polysaccharide, a solvent, and an auxiliary agent into a batching kettle, performing heating to 85-95° C., and performing stirring until a clarified solution is obtained so as to obtain a polysaccharide mixed solution; the solvent is pure water or an aqueous solution; the aqueous solution is a mixture of water and an organic solvent;
   (2) conveying the polysaccharide mixed solution in step (1) to a drip tray, and subjecting the drip tray to heat at 60-90° C.;
   (3) forming the polysaccharide mixed solution into spherical liquid drops by using a liquid drop forming device on the drip tray, and adding the spherical liquid drops into a forming tower for spherical gelling in the forming tower; and preparing polysaccharide spherical gels with different particle sizes by adjusting a volume of the liquid drops, wherein the particle sizes are 4-15 mm; an oily medium is included in the forming tower to maintain spherical shape of the liquid drops, and the forming tower is sequentially divided into a forming buffer area, a forming area and a curing area from top to bottom; the forming buffer area is controlled at a temperature of 40-50° C.; the forming area is controlled at a temperature of 10-40° C.; and the curing area is controlled at a temperature of 0-10° C.;
   (4) subjecting the polysaccharide spherical gels formed in step (3) to oil-sphere separation at a discharge port at a bottom of the forming tower by performing primary cleaning:
   subjecting the polysaccharide spherical gels to cleaning with micro-nano bubbles to obtain cleaned polysaccharide spherical gels and to recover the oily medium;
   (5) performing screening on the cleaned polysaccharide spherical gels according to size requirements to obtain qualified polysaccharide spherical gels with target sizes;
   (6) performing crosslinking: adding a crosslinking agent to the qualified polysaccharide spherical gels screened in step (5), performing stirring for 1-4 hours, then adding an alkaline solution, and performing stirring at 20-50° C. for 1-24 hours; and
   (7) performing secondary cleaning: cleaning the cross-linked polysaccharide spherical gels completely cross-linked in step (6) to reach a pH value of less than 8 so as to obtain the polysaccharide spherical gel resin.

2. The preparation method for polysaccharide spherical gel resin according to claim 1, wherein in step (1), the polysaccharide is a mixture of one or more of agar, agarose, carrageenan, pectin, gelatin, guar gum, chitosan and sodium alginate.

3. The preparation method for polysaccharide spherical gel resin according to claim 1, wherein in step (1), the organic solvent is a mixture of one or more of ethylene glycol, propylene glycol, glycerol, butanediol, ethanol, propanol, butanol, hexanediol, octanediol, cyclohexanol, ethylene glycol monomethyl ether, acetonitrile, acetone, tetrahydrofuran, ethyl acetate, citric acid, tartaric acid, polyethylene glycol, ionic liquid, sucrose and sorbitol; in the aqueous solution, a volume ratio of the water to the organic solvent is 50:50 to 100:0.

4. The preparation method for polysaccharide spherical gel resin according to claim 3, wherein the aqueous solution further comprises a salt; the salt is a mixture of one or more of a sodium salt, a potassium salt, a calcium salt, an aluminum salt and a magnesium salt.

5. The preparation method for polysaccharide spherical gel resin according to claim 1, wherein in step (1), the auxiliary agent comprises one of a pH regulator, a preservative, a flavor and a pigment.

6. The preparation method for polysaccharide spherical gel resin according to claim 1, wherein the crosslinking agent is a crosslinking agent containing an epoxy group, or comprising one of ethylene glycol diglycidyl ether, butanediol diglycidyl ether, polyethylene glycol diglycidyl ether, pentaerythritol tetraglycidyl ether, diethylene glycol diglycidyl ether and epichlorohydrin.

7. The preparation method for polysaccharide spherical gel resin according to claim 1, wherein in step (6), the alkaline solution is an aqueous solution of sodium hydroxide, potassium hydroxide, sodium carbonate, potassium carbonate, sodium phosphate or potassium phosphate, with a pH value of 10-14.

8. The preparation method for polysaccharide spherical gel resin according to claim 1, wherein an amount of the polysaccharide, an amount of the solvent, an amount of a salt in the aqueous solution, and an amount of the crosslinking agent by mass is 1-5 g, 100 g, 0.1-3 g, and 0.1-3 g, respectively.

* * * * *